Nov. 22, 1927.
J. A. THOMAS
PILOT HEADLIGHT
Filed Jan. 27, 1927
1,650,402
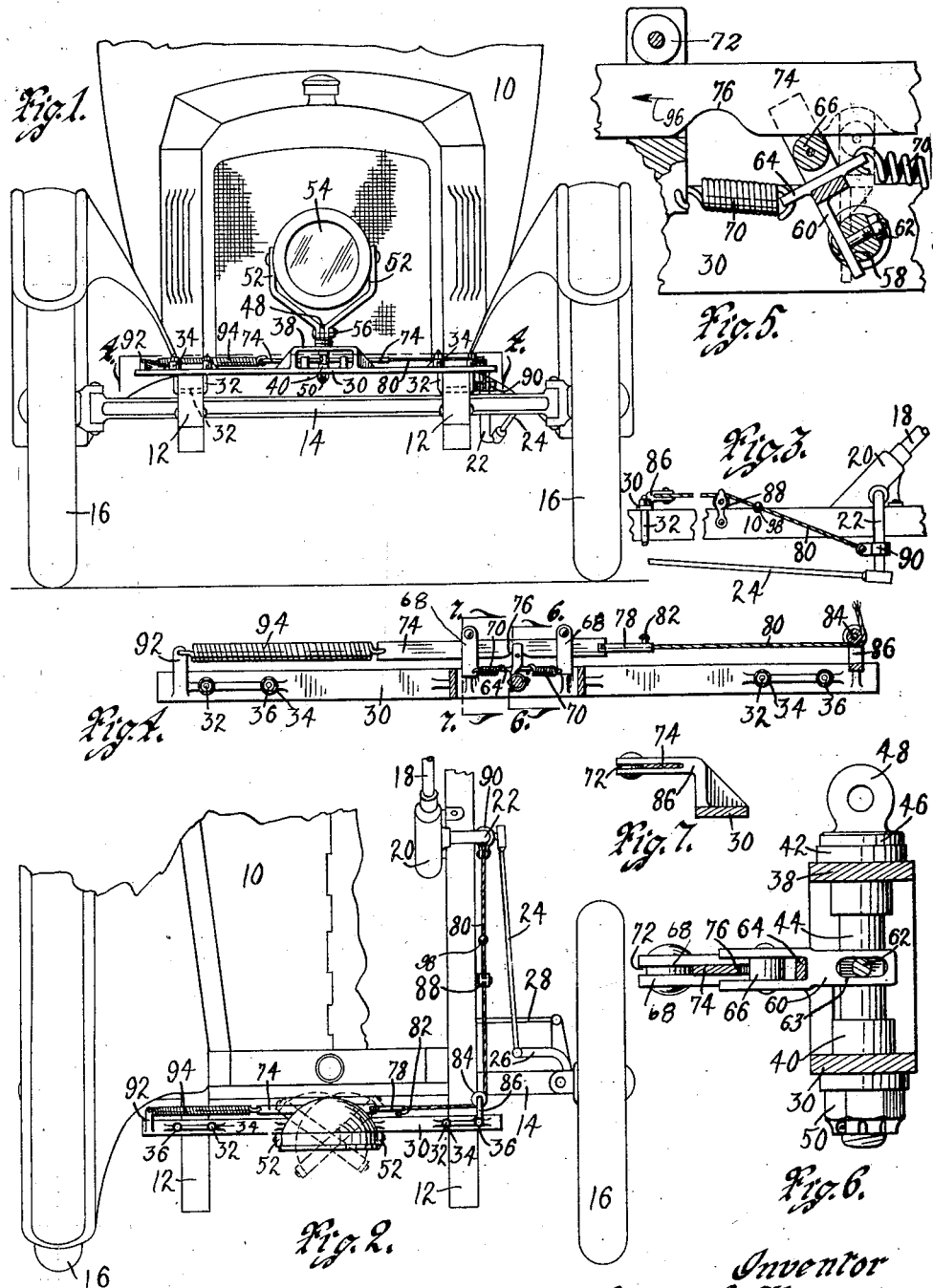
Witness
L. F. Landberg
Inventor
James A. Thomas
by Bair & Freeman Attorneys Patented Nov. 22, 1927.

1,650,402

UNITED STATES PATENT OFFICE.

JAMES ALFRED THOMAS, OF ALBERT LEA, MINNESOTA.

PILOT HEADLIGHT.

Application filed January 27, 1927. Serial No. 163,992.

The object of my invention is to provide a pilot head light for automobiles and the like of simple, durable, and comparatively inexpensive construction.

A further object is to provide a pilot head light having the head light mounted on a support as a unitary structure which may be attached to the forwardly extending frame members of an automobile as a unit, the only other connection necessary being a cable connection to a movable part of the steering mechanism of the automobile.

A further object is to provide such a pilot head light which is normally held in straight ahead position by springs, the ordinary steering operations of the automobile when driving straight ahead or slight deviations therefrom not affecting the head light.

A further object is to provide my pilot head light so constructed that upon turning a corner with the automobile, the head light will be swung on a vertical pivot to illuminate the road, turning to the left or right as the case may be.

Still a further object is to provide for turning the head light to a predetermined position at the commencement of the steering movement to the right or left and to thereafter leave the head light remaining in this turned position even though the steering mechanism is further actuated.

Still a further object is to provide for the return of the head light to its straight ahead position after the corner of the road has been turned.

Still a further object is to provide an actuating bar with a cable connection to a moving part of the steering mechanism for turning the front wheels of the automobile, the cable connection serving to move the actuated bar in one direction and a spring connection for keeping the cable taut and for actuating the bar in an opposite direction.

With these and other objects in view, my invention consists in the construction, arrangement and combination of the various parts of my invention, whereby the objects contemplated are attained, as hereinafter more fully set forth, pointed out in my claims, and illustrated in the accompanying drawings, in which:

Figure 1 is a front elevation showing a portion of an automobile with my improved pilot head light attached thereto.

Figure 2 is a plan view of the same, parts of the hood, fender apron and fender being broken away better to illustrate the attachment of my device to the automobile parts.

Figure 3 is a side elevation of a portion of the automobile frame showing the cable connection from the steering arm of the automobile to my pilot head light.

Figure 4 is a detail sectional view of my device taken on the line 4—4 of Figure 1.

Figure 5 is an enlarged view of the central portion of Figure 4, other parts being shown in section to illustrate the details of my device and its operation.

Figure 6 is an enlarged detail sectional view taken on the line 6—6 of Figure 4; and Figure 7 is an enlarged detail view taken on the line 7—7 of Figure 4.

On the accompanying drawing I have used the reference numeral 10 to indicate generally an automobile. The automobile 10 is provided with longitudinal side frame members 12 to which is secured through the medium of leaf springs a front axle 14. In the usual automobile construction, front wheels 16 are pivotally mounted on the axle 14 for the purpose of steering the automobile.

For actuating the front wheels 16 of the automobile for the purpose of steering, a steering wheel not shown is usually provided and secured to a steering shaft 18. The steering shaft 18 through suitable gearing mechanism within the casing 20 actuates a steering arm 22. A drag link 24 connects the lower end of the steering arm 22 to a spindle arm 26 on one of the spindles of the front wheels 16. The other front wheel 16 is likewise steered through the medium of a link 28 extending between the two wheels. The foregoing description relates to an automobile of ordinary construction and forms no part of my present invention.

My improved pilot head light comprises a bar 30 which may be positioned on top of the automobile frame members 12 in front of the radiator of the automobile. The bar 30 is secured to the frame members 12 by means of U-bolts 32 extending beneath the frame members 12 and up through bosses 34 on the bar 30. Nuts 36 are then screwed onto the U-bolts 32 for the purpose of securely clamping the bar 30 to the frame members 12. It may here be mentioned that a suitable fastening means other than the U-bolts 32 may be provided for the bar 30 and the bar 30 may be positioned on bumper supporting arms of the bumpers now found on a good many of the automobiles in use at the present time.

Spaced above the bar 30 and adjacent the center portion thereof is a bearing support 38. The bearing support 38 may be formed integral with the bar 30 or may be attached thereto in any manner. Extending through the bar 30 is a bearing bushing 40 and extending through the bearing support 38 is a similar bearing bushing 42. Rotatably mounted in the bearings 40 and 42 is a vertical shaft 44 having an enlarged head 46 formed with an ear 48. The lower end of the shaft 44 is screw threaded to receive a castellated nut 50 which may be tightened on the shaft 44 to prevent end play up and down of the shaft.

Pivotally mounted by means of a bolt 56 to the ear 48 are a pair of head light supports 52. Secured to the supports 52 by means of rivets or otherwise is a head light 54. The bolt 56 may be loosened and the supports and head light may be adjusted to throw the beam of light from the head light onto the ground any desired distance ahead of the automobile.

The vertical shaft 44 is provided with a depression 58, in which I secure an arm 60 by means of a bolt 62. The arm 60 has a slot 63 to receive the bolt 62 whereby the arm 60 may be adjusted longitudinally relative to the vertical shaft 44, the purpose of which will hereinafter be more fully described.

The arm 60 is provided with a pair of perforated extensions 64 extending in opposite directions from each other. The outer end of the arm 60 is bifurcated to receive a rotatably mounted roller 66.

Extending upwardly and outwardly from the bar 30 on either side of the vertical shaft 44 and the arm 60 are bifurcated actuating bar support members 68. Springs 70 are connected to these members 68 and to the extensions 64 for normally holding the arms 60 in a central position as illustrated in Figure 4 and in dotted lines in Figure 5. The corresponding position of the head light 54 when the arm 60 is in this position is straight ahead as illustrated in Figures 1 and 2 of the drawings.

Rotatably mounted between the arms of the bifurcated members 68 are rollers 72. An actuating bar 74 also extends between these arms and has one edge thereof in engagement with the rollers 72. In the opposite edge of the actuating bar 74 is a notch 76. The notch 76 is normally in dotted line position illustrated in Figure 5 and the roller 66 of the arm 60 is positioned between the sides of the notch 76. The arm 60 is normally held in this position by the springs 70 without being affected by engagement of the sides of the notch 76 with the roller 66.

Secured to one end of the actuating bar 74 is a tubular connection 78 in the end of which is received a cable 80. The cable 80 is held in the member 78 by a set screw 82. The cable extends substantially parallel to the bar 30 and around a pulley 84 supported in a pulley frame 86 extending from the bar 30. The cable 80 extends back along the frame of the automobile and over another pulley 88 and from there to a clamp member 90. The clamp member 90 extends around the steering arm 22 to which it is clamped and is secured to the end of the cable 80.

On the end of the bar 30 opposite the pulley 84 is an extension 92. Hooked to the extension 92 and to the free end of the actuating bar 74 is a spring 94. The spring 94 is for the purpose of keeping the cable taut whereby the actuating bar 74 is properly operated to affect the head light 54. In this connection, the cable 80 moves the bar in one direction when the steering mechanism of the car is actuated in one direction and upon actuation of the mechanism in the other direction the cable slackens, allowing the spring 94 to move the bar 74 in an opposite direction.

In operation the automobile may be assumed as maintaining a straight ahead course. In this case there will usually be slight deviations from straight ahead position or oscillations of the front wheels 16 of the automobile. These oscillations would tend to move the bar 74 in correspondence therewith. Inasmuch as the notch 76 is wider than the diameter of the roller 66 these oscillations would not affect the arm 60 and consequently would not turn the head light 54 from its straight ahead position which is being maintained by the springs 70.

Upon turning a corner, the bar 74 would be considerably moved for instance to the position shown in Figure 5. In this case one side of the notch 76 would engage the roller 66 to swing the arm 60 and consequently the head light 54 in a direction to correspond to the steering movement of the front wheels. Swinging the arm 60 radially about the pivot point established by the vertical shaft 44 however swings the roller 66 with it and away from the bottom of the notch 76 so that eventually the roller 66 becomes disengaged from the notch 76, the roller itself now contacting with the edge of the bar 74 as shown in Figure 5. When the bar 74 has been moved by the spring 94 in the direction of the arrow 96 (Figure 5) to the position shown for instance with the roller 66 out of the notch 76 and contacting with the edge of the bar 74, a stop 98 on the cable 80 engages the pulley 88. This allows the spring 94 to maintain the cable taut between the bar and the pulley 88 and any slack then occurring in the cable will be between the pulley 88 and the steering arm 22 and will not interfere with any working parts of the automobile.

From the foregoing it will be obvious that the head light 54 would be turned a predetermined amount and thereafter remain in the turned position even though the bar 74 is moved further on account of a further steering movement of the front wheels 16 of the automobile. Upon traveling in a straight ahead course the springs 70 will maintain the head light 54 in a central position.

The degree of predetermined turning movement of the head light 54 may be varied by loosening the bolt 62 and sliding the arm 60 toward or away from the bar 74. This causes the roller 66 to extend deeper into the notch 76 or farther out of it as the case may be thereby affecting the time at which the roller 66 leaves the notch 76 of the bar 74. It is obvious that I have provided a unitary pilot head light construction which may be readily secured to an automobile without the necessity of securing one part at one point on the automobile and another at another point etc. After the unitary structure comprising the actuating mechanism, supporting bar and head light have been secured to the automobile it is merely necessary to hook up the transmisison mechanism for actuating the pilot head light from a moving part of the steering mechanism of the automobile.

Some changes may be made in the construction and arrangement of the various parts of my light, without departing from the real spirit and purpose of my invention, and it is my intention to cover by my claims, any modified forms of structure or use of mechanical equivalents, which may be reasonably included within their scope.

I claim as my invention:

1. A pilot head light for automobiles comprising a supporting bar, a vertical shaft rotatably mounted thereon, an arm and a head light secured to said vertical shaft, spring means for maintaining said arm in normal position, an actuating bar slidably mounted on said supporting bar, the free end of said arm being arranged in the path of travel of one edge of said actuating bar, a notch in said edge for normally receiving said arm whereby movement of said actuating bar will cause swinging movement of said arm to a predetermined position, said vertical shaft being positioned relative to said actuating bar whereby swinging movement of the arm from normal position will cause the arm to swing out of the notch and said spring means will cause said arm to engage the edge of said actuating bar and thereby maintain the head light in its predetermined position regardless of further movement of the actuating bar, flexible means for connecting one end of said actuating bar to a moving part of the steering mechanism of the automobile and a spring connecting the other end of the actuating bar to said supporting bar for maintaining said flexible means taut and for moving said actuating bar in one direction.

2. A pilot head light comprising a supporting bar, a vertical shaft rotatably mounted thereon, an arm and a head light secured to said vertical shaft, an actuating bar slidably mounted on said supporting bar, the free end of said arm being arranged in the path of travel of one edge of said actuating bar, a notch in said edge for normally receiving said arm whereby movement of said actuating bar will cause swinging movement of said arm to a predetermined position, said vertical shaft being positioned relative to said actuating bar whereby swinging movement of the arm from normal position will cause the arm to swing out of the notch whereby said arm will engage said edge of the actuating bar and rotation of the vertical shaft will cease even though the sliding movement of the actuating bar continues.

3. A pilot head light comprising a supporting bar, a vertical shaft rotatably mounted thereon, an arm and a head light secured to said vertical shaft, spring means for maintaining said arm in normal position, an actuating bar slidably mounted on said supporting bar, the free end of said arm being arranged in the path of travel of one edge of said actuating bar, a notch in said edge for normally receiving said arm whereby movement of said actuating bar will cause swinging movement of said arm to a predetermined position, said vertical shaft being positioned relative to said actuating bar whereby swinging movement of the arm from normal position will cause the arm to swing out of the notch and said spring means will cause said arm to engage the edge of said actuating bar and thereby maintain the head light in its predetermined position regardless of further movement of the actuating bar.

4. A pilot head light comprising a supporting bar mounted on the frame of an automobile in front of the radiator thereof, a vertical shaft rotatably mounted on said supporting bar, a head light and an arm secured to said shaft, an actuating bar slidably mounted on said supporting bar adjacent the free end of said arm and having a notch between the sides of which the free end of the arm normally rests whereby movement of said actuating bar in either direction will cause engagement between a side of said notch and the free end of said arm for rotating said vertical shaft and said head light a predetermined distance, the free end of said arm thereafter engaging the edge of said actuating bar as the bar is moved whereby the head light is maintained in such predetermined position.

5. A pilot head light comprising a supporting bar mounted on the frame of an automobile in front of the radiator thereof, an oscillatably mounted head light on said supporting bar, an arm on said head light, an actuating bar slidably mounted on said supporting bar, a notch in said actuating bar, the free end of said arm being adapted to normally rest between the sides of said notch and a cable connecting said actuating bar to a moving part of the steering mechanism of the automobile whereby movement of said steering mechanism in either direction will cause said head light to turn in a corresponding direction.

6. In combination with a vehicle having frame members extending forwardly from the vehicle and a movable steering arm mounted on said frame for actuating the steerable wheels of the vehicle, a pilot head light comprising a supporting bar mounted on said frame, an oscillatably mounted head light on said supporting bar, an arm on said head light, an actuating bar slidably mounted on said supporting bar, a notch in said actuating bar, the free end of said arm being adapted to normally rest between the sides of said notch and a cable connecting said actuating bar to said steering arm whereby movement of said steering arm in either direction will cause said head light to turn in a corresponding direction.

7. A pilot head light comprising a supporting bar mounted on the frame of an automobile in front of the radiator thereof, a vertical shaft rotatably mounted on said supporting bar, a head light and an arm secured to said shaft, an actuating bar slidably mounted on said supporting bar adjacent the free end of said arm and having a notch between the sides of which the free end of the arm normally rests whereby movement of said actuating bar in either direction will cause engagement between a side of said notch and the free end of said arm for rotating said vertical shaft and said head light.

8. A pilot head light comprising a supporting bar mounted on the frame of an automobile in front of the radiator thereof, a vertical shaft rotatably mounted on said supporting bar, a head light and an arm secured to said shaft, an actuating bar slidably mounted on said supporting bar adjacent the free end of said arm and having a notch between the sides of which the free end of the arm normally rests whereby movement of said actuating bar in either direction will cause engagement between a side of said notch and the free end of said arm for rotating said vertical shaft and said head light, and means for connecting said actuating bar to a movable part of the steering mechanism of the automobile.

Des Moines, Iowa, Jan. 4, 1926.

JAMES ALFRED THOMAS.